(No Model.)
Z. FOSS.
COMPOSITION FOR COATING CORN COB PIPES.
No. 352,814. Patented Nov. 16, 1886.
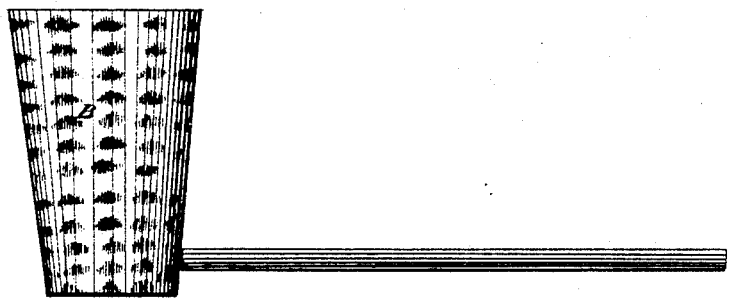
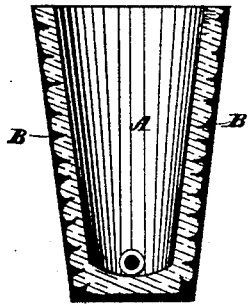
WITNESSES
F. L. Ourand
Edward Stanton
Zachariah Foss,
INVENTOR,
By Louis Bagger & Co.
Attorney

UNITED STATES PATENT OFFICE.

ZACHARIAH FOSS, OF WASHINGTON, MISSOURI.

COMPOSITION FOR COATING CORN-COB PIPES.

SPECIFICATION forming part of Letters Patent No. 352,814, dated November 16, 1886.

Application filed July 6, 1886. Serial No. 207,198. (No specimens.)

*To all whom it may concern:*

Be it known that I, ZACHARIAH FOSS, a citizen of the United States, and a resident of Washington, in the county of Franklin and State of Missouri, have invented certain new and useful Improvements in Corn-Cob Pipes; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of a corn-cob pipe provided with my improved coating, and Fig. 2 is a transverse sectional view of the bowl of the same.

Similar letters of reference indicate corresponding parts in both the figures.

My invention has relation to coatings for the outsides of corn-cob pipes; and it consists in the improved combination of ingredients for coating such pipes, as hereinafter more fully described and claimed.

In the accompanying drawings, the letter A indicates the bowl of the pipe, which is made of a common corn-cob turned down to offer a comparatively smooth surface, and B indicates the coating, which is applied to the pipe so as to fill all interstices in the outside of the bowl, forming a smooth surface and a surface capable of receiving a polished finish of any desired color.

The coating is composed of the following elements, viz: Two-sixths parts of cement, three-sixths parts of chalk, one-twelfth part of sulphate of potassium, and one-twelfth part of pumice-stone.

The cement in this composition is used as a sticking body for the composition, being capable of settling in the interstices of the pipe and to bind in the same, and the chalk is used for the purpose of receiving any suitable coloring-matter, serving as a vehicle for the said coloring-matter, and at the same time serving to give a body to the composition, together with the cement, as well as an absorbent. The pumice-stone is likewise used as a body for the composition, and at the same time as a suitable vehicle for coloring-matter, and the sulphate of potassium is used for the purpose of quickening the hardening of the cement, and at the same time for giving the composition a sufficient hardness to receive a high finish.

This composition may be colored to any desired color, and is susceptible to a very fine and high polish, so that a pipe prepared with this composition may have any color suiting the taste and fancy of the purchaser, and may be polished very highly, giving it an ornamental appearance.

Having thus described my invention, I claim as new and desire to secure by Letters Patent of the United States—

A composition for an outside coating for corn-cob pipes, consisting of the following elements, viz: cement, chalk, sulphate of potassium, and pumice-stone, in about the proportions herein stated, and for the purposes set forth.

In testimony that I claim the foregoing as my own I have hereunto affixed my signature in presence of two witnesses.

ZACHARIAH FOSS.

Witnesses:
E. E. OWENS,
L. L. OWENS.